US011663138B2

(12) United States Patent
Erickson et al.

(10) Patent No.: US 11,663,138 B2
(45) Date of Patent: May 30, 2023

(54) HETEROGENOUS-LATENCY MEMORY OPTIMIZATION

(71) Applicant: Rambus Inc., San Jose, CA (US)

(72) Inventors: Evan Lawrence Erickson, Chapel Hill, NC (US); Christopher Haywood, Cary, NC (US); Mark D. Kellam, Siler City, NC (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/543,449

(22) Filed: Dec. 6, 2021

(65) Prior Publication Data

US 2022/0179799 A1 Jun. 9, 2022

Related U.S. Application Data

(60) Provisional application No. 63/123,439, filed on Dec. 9, 2020.

(51) Int. Cl.
| | | |
|---|---|---|
| *G06F 12/10* | (2016.01) | |
| *G06F 12/1009* | (2016.01) | |
| *G06F 13/16* | (2006.01) | |
| *G06F 12/0804* | (2016.01) | |
| *G06F 12/123* | (2016.01) | |
| *G06F 12/0882* | (2016.01) | |

(52) U.S. Cl.
CPC ...... *G06F 12/1009* (2013.01); *G06F 12/0804* (2013.01); *G06F 12/0882* (2013.01); *G06F 12/123* (2013.01); *G06F 13/1668* (2013.01); *G06F 2212/7201* (2013.01)

(58) Field of Classification Search
CPC ............ G06F 12/0804; G06F 12/1009; G06F 2212/7201; G06F 12/123; G06F 12/0882; G06F 13/1668
USPC .......................................................... 711/118
See application file for complete search history.

(56) References Cited

U.S. PATENT DOCUMENTS

| | | |
|---|---|---|
| 6,839,739 B2 | 1/2005 | Wilson |
| 9,886,394 B2 | 2/2018 | Patel et al. |
| 10,810,133 B1* | 10/2020 | Volpe ............... G06F 12/128 |
| 2018/0373641 A1* | 12/2018 | Partap Singh Rana .................... G06F 11/34 |
| 2020/0310993 A1* | 10/2020 | Kumar .................. G06F 3/0604 |

* cited by examiner

*Primary Examiner* — Hua J Song
(74) *Attorney, Agent, or Firm* — Charles Shemwell (57) ABSTRACT

Memory pages are background-relocated from a low-latency local operating memory of a server computer to a higher-latency memory installation that enables high-resolution access monitoring and thus access-demand differentiation among the relocated memory pages. Higher access-demand memory pages are background-restored to the low-latency operating memory, while lower access-demand pages are maintained in the higher latency memory installation and yet-lower access-demand pages are optionally moved to yet higher-latency memory installation.

19 Claims, 7 Drawing Sheets

HETEROGENOUS-LATENCY MEMORY OPTIMIZATION

CROSS REFERENCE TO RELATED APPLICATIONS

This application hereby claims priority to and incorporates by reference U.S. provisional application No. 63/123,439 filed Dec. 9, 2020.

DRAWINGS

The various embodiments disclosed herein are illustrated by way of example, and not by way of limitation, in the figures of the accompanying drawings and in which like reference numerals refer to similar elements and in which.

DETAILED DESCRIPTION

In various embodiments disclosed herein, memory pages are dynamically migrated between higher latency and lower latency operating memory installations based on run-time collected access statistics. In a number of embodiments, memory pages are migrated in the background, transparently to processes that access those memory pages, and in some cases to memory installations accessed through a server-to-server interconnect fabric that supports transmission of load and store commands (memory reads and writes) from an access-requesting server to an access-fulfilling server. In those and other embodiments, a memory virtualizing component cyclically relocates selected pages from low-latency local operating memory of a server computer to a higher-latency memory installation accessed via the memory virtualizing component to enable high-resolution access monitoring (e.g., counting every access to a given memory page, applying historically collected access data, etc.) and thus access-demand differentiation among those memory pages. Warmer (more frequently accessed) pages may be returned to the lowest-latency memory installation, while cooler (less frequently accessed) pages are maintained in the higher latency memory installation and even colder pages are moved to yet higher-latency memory installations, including memory installations accessed via the memory-semantic (load/store-conveying) interconnect fabric.

In a number of embodiments, a memory-pooling server computer ("memory-pooling server") publishes/exposes a "free queue" of addresses and related information that enables allocation of local memory pages to one or more other server computers, and each of the other server computers likewise implements a free-queue publishing memory-pooling server such that the complete set of published free queues defines a collective memory pool backed by physical memory pages distributed among the memory-pooling servers. Through this arrangement and server interconnection through the aforementioned memory virtualizer component ("memory virtualizer") and memory-semantic interconnect fabric, physical memory in any memory-pooling server may be allocated to and load/store-accessed by any another memory-pooling server—for example, allowing allocation of any memory in a data center to a given server and thus avoiding the memory stranding (memory siloed within individual servers/operating-systems) that plagues conventional data center installations.

In free-queue-publishing and other embodiments, memory access requests are routed alternately to local or remote memory (the latter including operating memory installations on memory-pooling servers other than the access-requesting server, as well as a memory installation attached to and accessed via the memory virtualizer resident within the access-requesting server) in a manner transparent to the local operating system and hosted processes. Further, in a number of embodiments, the memory virtualizer configures and maintains address-translation page tables for both local operating memory and remote memory, associating multi-bit access counters with the remote-memory page tables (i.e., for pages accessed via the memory virtualizer) that enable fine-grained (high-resolution) differentiation between warmer and colder memory pages—that is, collection of access statistics beyond the limited single-bit (accessed or not accessed) information available in conventional page tables and thus support for page distribution across the memory-latency hierarchy in accordance with relative memory-page warmth. These and other embodiments and features are discussed in further detail below.

Figure 1:
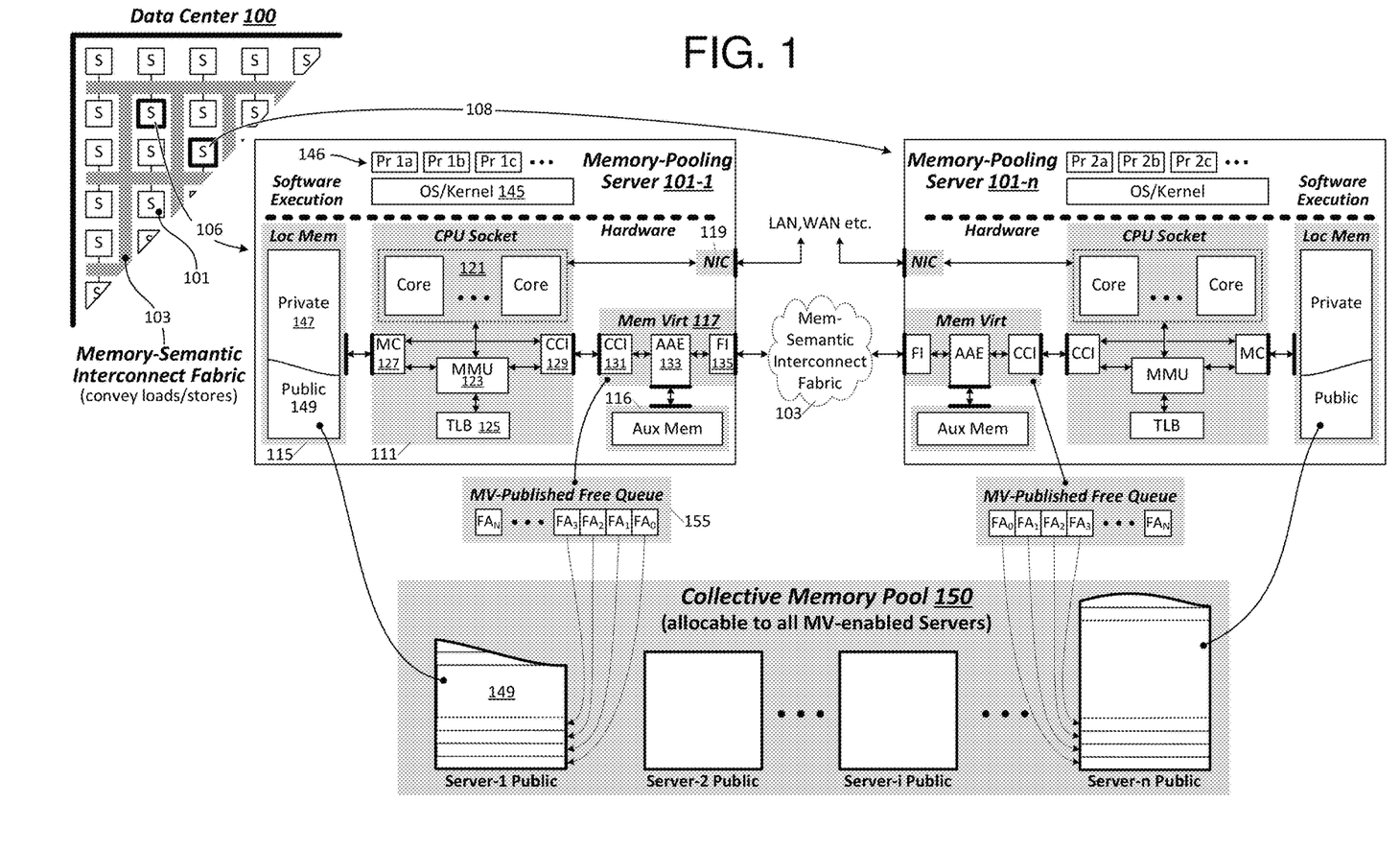
FIG. 1 illustrates an exemplary data center having a set of 'n' memory-pooling servers coupled to one another via a memory-semantic interconnect fabric.

FIG. 1 illustrates an exemplary data center 100 having a set of 'n' memory-dynamic-page-migration memory-pooling servers 101 ("MP server" or "server") coupled to one another via a memory-semantic interconnect fabric 103. As shown in the embodiments at 106 and 108 (showing exemplary detail within MP servers 101-1 and 101-n, respectively), each MP server includes one or more CPUs (central processing units) 111, a local operating memory 115, an auxiliary memory installation 116, and a memory-virtualizer 117, the latter coupled to counterpart virtualizers 117 of other MP servers via interconnect fabric 103 and also providing an access path to auxiliary memory 116 (also referred to herein as "virtualizer-attached memory"). Each server 101 may also include a network interface card 119 (NIC) or the like to enable connection to a conventional communication network (e.g., local area network, wide area network, etc., that enables application-layer data transport according to standard-defined physical interconnect and protocol suites such as Ethernet, TCP/IP, etc.). In one embodiment, each CPU includes one or more processor cores 121 together with various supporting components including, for example and without limitation, a memory-management unit 123 (MMU), translation lookaside buffer 125 (TLB), memory controller 127 (MC) and cache-coherent interface 129 (CCI)—functional circuit blocks integrated within an integrated circuit (IC) package installed within a socket on a motherboard (or blade or other printed circuit board) and thus occasionally referred to herein as a CPU socket (i.e., to emphasize the various functionality of the socketed component aside from core instruction processing). The memory subsystem 115—assumed for purposes of example to be dynamic random access memory (DRAM) organized in dual inline memory modules (DIMMS)—is likewise mounted in one or more motherboard or blade sockets (e.g., DIMM sockets) and coupled via conductive data and control traces to the CPU socket and more specifically to memory control component 127 via one or more memory access channels. Memory virtualizer 117 may similarly be socketed on the motherboard (or backplane blade) and coupled to the CPU socket via a signaling link that extends between a cache-coherent interface 131 within the virtualizer and its CPU-side counterpart (129) and auxiliary memory 116 may also be implemented by socketed DRAM DIMMS coupled via control and data traces to memory virtualizer 117.

As discussed below, memory virtualizer 117 additionally includes an access/allocation engine 133 (AAE) and a fabric interface 135 (FI), the former serving as a centralized memory allocation coordinator for all operating memory pages allocated to processes executed by local CPU cores 121 (and pages allocated to CPU cores of other MP servers), and also as the gateway and access-statistics collector for local-CPU access requests that map to remote memory—that is, to MV-attached memory 116 and/or memory installations on other MP servers. More specifically, a memory control component of allocation/access engine 133 responds to loads/stores directed to MV-attached memory by issuing corresponding signals to the auxiliary memory installation (116), while load-stores directed to cross-fabric memory (i.e., memory on other MP servers) are forwarded to fabric interface 135. The fabric interface transmits and receives inter-server memory allocation requests and memory load/store instructions via the memory-semantic interconnect fabric 103 (e.g., implemented by Gen-Z or other load/store memory interconnect).

Though the general memory-pooling server architecture shown at 106 (and identically in counterpart server at 108) is carried forward in discussions that follow, more specific implementations may vary in numerous aspects, all or any of which may apply within the various embodiments presented herein. For example, the signaling link between cache coherent interfaces 129 and 131 (i.e., CPU-virtualizer interconnect) may be any standardized signaling link (e.g., peripheral component interconnect express (PCIe), Hyper-Transport (HT), etc.) that supports standardized memory-semantic/cache-coherent protocols including, for example, and without limitation Compute Express Link (CXL), Open Coherent Accelerator Processor Interface (OpenCAPI), etc. Also, any or all socketed components (which may have any form factor, including printed circuit board with edge connector and mounted integrated circuit components, socket-inserted integrated circuit components, etc.) may instead be directly mounted (e.g., soldered) to an interconnect substrate (motherboard, blade, etc.) and/or integrated with others of those components within an integrated circuit package (e.g., integrated within an IC die or within a system-on-chip or other multi-die IC package). Additionally, while the memory-pooling servers 101 may generally include various hierarchically accessed storage devices (including mass-storage media in the form of solid-state or mechanically accessed disk), the local memory installation shown at 115 in FIG. 1 implements the high-bandwidth, low-latency operating memory (main memory, system memory, system RAM, etc.) from which the CPU fetches a run-time stream of executable instructions and to which the CPU directs data load and store operations on behalf of code-execution-instantiated entities (operating system (OS) or kernel, and processes hosted by the kernel and underlying CPU). While generally having a higher latency than local memory 115 (i.e., due to auxiliary memory access via cache-coherent interfaces 129/131), auxiliary memory 116 also implements a high-bandwidth, low-latency operating memory. In a number of embodiments, local memory 115 and auxiliary memory 116 are implemented by dynamic random access memory (DRAM) organized in conventional dual inline memory modules (DIMMS) and accessed through successive row activation and column read/write operations. In alternative embodiments, other low-latency, high-bandwidth storage technologies (e.g., capable of supplying instruction and data at or near CPU demand rates) may implement memory 115 and/or memory 116 instead of or together with DRAM components, and any DRAM components (or other memory technologies) may be mounted to or within memory modules other than DIMMs (e.g., individually socketed multi-die IC package).

Still referring to FIG. 1, during server boot-up or sometime after, an operating system/kernel 145 (i.e., functional instantiation effected by CPU execution of software/code—used interchangeably and comprehensively herein to include, for example and without limitation, a hypervisor, virtual machine manager (VMM), etc.) within each memory-pooling server 101 partitions the physical address space of the local CPU socket(s)—the local physical address (LPA) space—by assigning a subset of the local physical addresses (LPAs) within the LPA space to local memory 115 and associating the remaining LPAs with memory virtualizer 117. Through this operation, memory virtualizer 117 is perceived by local CPUs as a supplemental memory controller (accessible via cache coherent interface 129) to which LPAs may be issued together with load/store instructions. Memory virtualizer 117 responds to memory allocation and access requests by alternately bridging those requests via interconnect fabric 103 for fulfillment within a far (remote) server, or fulfilling those requests out of virtualizer-attached memory 116. In either case, the complexity of the memory virtualizer operation is abstracted from the local CPU (and local operating system and local processes 146 instantiated by the local CPU) as the CPU merely need issue the load/store instructions to an LPA associated with the memory virtualizer as it would with a conventional memory controller. The kernel may (at boot-up or thereafter) also partition the LPA sub-range mapped to local memory 115 into private and public LPA ranges, reserving the private memory range or "private or reserved memory" 147 for exclusive load/store access by local CPU sockets 111 and, conversely, enabling memory mapped to the public LPA range ("public memory" 149) to be allocated to other memory-pooling servers via memory virtualizer 117, effectively contributing or donating the public memory to a collective memory pool 150 from which physical memory pages may be allocated to a requesting process executing on any memory-pooling server. The kernel may also coordinate with memory virtualizer regarding private/public designation of auxiliary memory 116, enabling some or all of auxiliary memory to be reserved for local CPU use and, conversely, some or all of memory 116 to be allocated to other MP servers.

In one embodiment, the kernel communicates the local-private memory, local-public memory and virtualizer-associated LPA sub-ranges to allocation/access engine 133 within the server-resident virtualizer 117, which in turn constructs a corresponding set of free queues containing, as queue elements (or linked-list elements), LPAs within the corresponding sub-range. Allocation/access engine 133 may also construct a fabric-address (FA) free queue to be published/exposed to remote virtualizers. In an embodiment shown in FIG. 2, memory virtualizers 117 deployed within respective MP servers exchange head-of-published-free-queue addresses (FQAs) and available-memory metrics (i.e., amount of local memory available within a given MP server for allocation to other servers and optionally an indication of quantity of public memory already allocated) via interconnect fabric 103 or other communication channel, updating the available-memory metric from time to time or in response to allocation events. Through this information exchange, each memory virtualizer 117 (i.e., $MV_1$-$MV_n$) is informed, at any given time, of volume and location of allocable memory on specific remote servers and thus may issue targeted allocation requests with generally assured success. Each memory virtualizer, shown for example in detail view 160, also maintains a set of free queues 161 (shown in further detail view 163) that include a published free queue 155 (list of fabric addresses (FAs)), a private local-memory free queue 165 (list of LPAs that resolve to local private memory), a public local-memory free queue 167 (list of LPAs corresponding to local public memory), and a virtualizer-associated LPA free queue 169, the latter containing LPAs to be mapped (i) directly to pages within virtualizer-attached memory and (ii) indirectly (via fabric addresses shared between MP servers) to LPAs for public memory within other servers. In the depicted embodiment, an embedded control component 173 (i.e., "MV controller" implemented, for example, by a programmed processor, sequencer, finite state machine, etc.) responds to locally- and remotely-sourced memory-allocation and memory-release (free) requests by updating head and tail pointers for a selected free queue (e.g., advancing head and tail pointers to pop elements off and add elements to a given free queue, respectively) and updating inbound/outbound translation lookaside buffers 171, 172 (inbound referring to memory access requests received from a remote server via the fabric interface, and outbound referring to memory access requests received from a host CPUT via the cache-coherent interface).

In a page-fault-triggered allocation scheme, a memory allocation request is triggered when a process (e.g., as shown at 146 in FIG. 1) issues a load/store to a virtual address (VA) for which there is no associated local physical address—a page-fault scenario that invokes the local operating system's page-fault handler to map the virtual address to a local physical address for an available page of memory. In contrast to conventional systems in which LPAs having no local physical memory association are unused (i.e., at least for memory access purposes), an MP server according to embodiments herein maps those extra (beyond the local physical memory) LPAs to the memory virtualizer component (as discussed above) which, in turn, associates the LPAs with remote memory—that is cross-fabric memory installed on another MP server and virtualizer-attached memory. By this operation, LPAs issued by the CPU's memory management unit (i.e., obtained by applying virtual address to TLB and, if necessary, in a VA-to-LPA page table walk) may be directed to either the local memory controller (if the LPA decodes to a page of local memory) or to the memory virtualizer. In the latter case, the virtualizer uses the LPA to execute a load/store operation within "remote" memory—that is, to either (i) execute a cross-fabric load or store within the memory on a remote server or (ii) execute a load or store within the virtualizer attached memory—hiding the remote nature of the accessed memory from the local CPU and thus enabling the local CPU to perceive and exploit a dramatically increased memory capacity as compared to the local physical memory alone. In effect, the memory virtualizer appears to the local CPU to be simply another local memory controller (albeit accessible via the cache-coherent interface) to which loads/stores at a VA-indexed (virtual address applied to look up) LPA may be issued.

Figure 2:
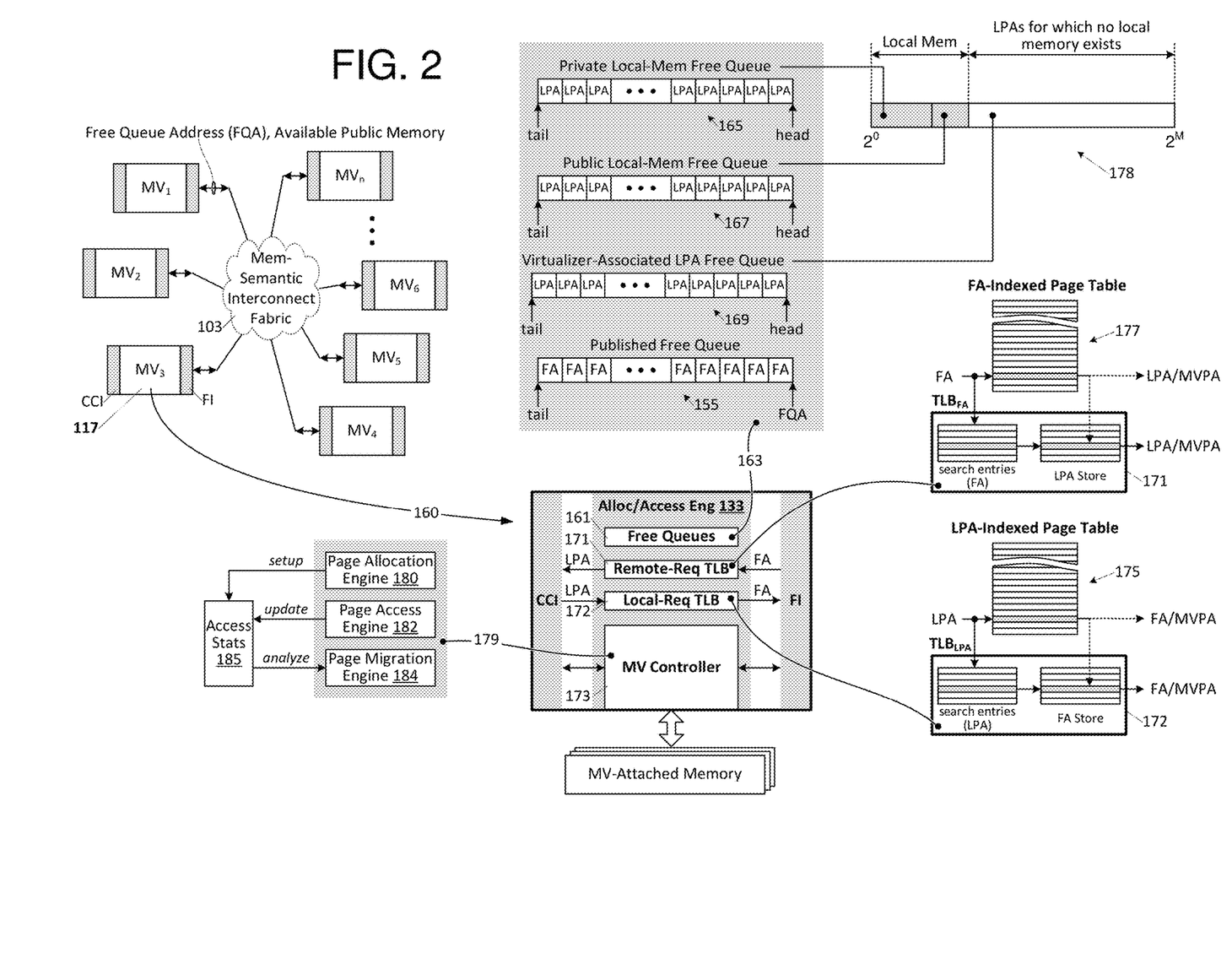
FIG. 2 illustrates more detailed embodiments of memory virtualizers deployed within respective memory-pooling servers, showing exemplary address mapping and page allocation, access and migration components thereof.

In the FIG. 2 embodiment, each memory virtualizer 117 fulfills all memory allocation requests from local CPUs (coordinating with remote virtualizers as necessary to complete allocations of remote memory in other MP servers) and also supports allocation requests from remote virtualizers. Allocation requests from local CPUs are generally fulfilled according to predetermined or programmed fulfillment policies (e.g., first out of local private memory, then out of local public memory, then out of virtualizer-attached remote memory and then out of cross-fabric remote memory), though parameterized requests specifying memory location and/or characteristics (e.g., average access latency) may be supported/enabled in various embodiments and/or operating configurations. To fulfill an allocation request from a local CPU out of local memory, memory virtualizer pops (delinks) an LPA from the head of the private local-memory free queue 165 and stores the de-linked LPA within the system page table (i.e., the page-table walked by the MMU) at a location indexed by a virtual address (VA) supplied by the operating system's page-fault handler (VA combined in a tuple with process identifier for process that triggered the page fault). Thereafter, the page-faulting memory access is completed by the local CPU socket (i.e., page-table walk executed by socket-resident memory management unit (MMU) to retrieve the LPA from the newly created page-table entry and load the LPA into the socket-resident TLB, followed by application of LPA to local memory controller) without involvement from the memory virtualizer (i.e., no additional overhead as compared to a conventional memory access). Memory virtualizer 117 fulfills a local-CPU allocation request out of public local memory in essentially the same way, but popping the LPA off the public local-memory free queue 167 instead of the private local-memory free queue and then updating the system page table/TLB as in the private local memory allocation. To fulfill an allocation request from a local CPU out of remote memory (virtualizer-attached memory or cross-fabric memory), the virtualizer once again populates the system page table and socket-resident TLB with a VA-indexed LPA (popping the LPA off the virtualizer associated LPA free queue 169 instead of either local memory free queue) but then additionally maps the LPA to either a fabric address (FA) obtained from a remote memory virtualizer (i.e., reading the published FQA of a selected MP server) or to a physical address within the virtualizer-attached memory (MVPA) within LPA-indexed translation structures maintained by MV controller 173, including an LPA-indexed page table 175 (i.e., page table indexed by local physical address to retrieve corresponding FA or MVPA) and corresponding LPA-indexed TLB 172 (searched by LPA to yield corresponding FA/MVPA on TLB hit and page table walk on TLB miss). During a subsequent load/store to a virtual address that resolves to remote memory, the local MMU (resident within the CPU socket) translates the VA into an LPA associated with the virtualizer (i.e., the virtualizer-associated LPA popped from queue 169) which, by virtue of that association, is applied to the LPA-indexed TLB 172 maintained by MV controller 173 to yield either (i) a physical address (MVPA) that is applied via memory control circuitry within MV controller 173 to access MV-attached memory, or (ii) a fabric address previously obtained from a remote virtualizer FQA. In the latter case, the fabric address is transmitted across the memory-semantic interconnect fabric to the remote virtualizer together with the load/store instruction (and write data in the case of a store instruction) to implement the remote memory access.

Continuing with remote memory allocation, the memory virtualizer within the remote server (i.e., the allocation-fulfillment virtualizer and its host server) responds to the published free queue read (i.e., read from the fulfillment-virtualizer-published FQA by the allocation requesting virtualizer) by (i) popping an FA off the head of the free queue 155 published by the remote virtualizer (and returning the de-linked FA to the allocation-requesting virtualizer), (ii) popping an LPA off the head of either the public local-memory free queue 167 or virtualizer-associated free queue 169 (both within the remote virtualizer), and (iii) storing the de-linked LPA within FA-indexed translation structures (i.e., storing either local memory LPA or virtualizer-attached memory PA (MVPA) in FA-indexed location within FA-indexed page table 177 and within an FA-indexed entry within TLB 171). During a subsequent load/store issued by an access-requesting virtualizer together with the FQA-obtained FA, the inbound FA is translated to the corresponding LPA or MVPA via FA-indexed TLB 171 (walking FA-indexed page-table 177 in the case of a TLB miss) followed by application, within the access-fulfillment server, of the inbound load/store instruction to the local memory controller (with LPA) or to the virtualizer-attached memory controller (with MVPA). Thus, a load/store instruction directed to remote memory triggers a varying number of address translations depending on whether fulfillment occurs within virtualizer-attached memory (local auxiliary memory as shown at 116 in FIG. 1) or within cross-fabric remote-server memory and the manner in which virtualizer-attached memory is addressed (i.e., by virtualizer private physical address, MVPA, or directly by CPU/MMU-issued LPA). In the former (intra-server fulfillment) case, a process-supplied VA is translated to a virtualizer-associated LPA within the MMU/TLB of the local CPU, and then, in a memory virtualizer embodiment that addresses virtualizer-attached memory via a virtualizer-private address mapping, from the virtualizer-associated LPA to an MVPA within the LPA-indexed TLB (with LPA-indexed page table walk as necessary) of the local memory virtualizer. Where the memory virtualizer maps the virtualizer-attached memory directly within the virtualizer-associated address range, no LPA-to-MVPA translation is required (the LPA may be applied without translation to address the virtualizer-attached memory), though the LPA may still be applied to an access counter lookup. In the latter (cross-fabric fulfillment case), the process-supplied VA is translated to a virtualizer-associated LPA within the MMU/TLB of the local CPU, then from the virtualizer-associated LPA to a fabric address within the LPA-indexed TLB (with LPA-indexed page table walk as necessary) of the local virtualizer, and then (after transmission of the FA to the remote access-fulfilment server) from the FA to the remote-server LPA or MVPA within the FA-indexed TLB (with FA-indexed page table walk as necessary) of the access-fulfilling (remote) virtualizer.

Referring to the exemplary LPA range (addresses from $2^0$ to $2^M$) shown at 178 in FIG. 2 (i.e., in which MV controller 173 within the exemplary memory virtualizer at 160 manages the various free queues shown at 163, coordinates with the host-server CPUs via cache-coherent interface (CCI), manages population of and access to LPA-indexed/FA-indexed TLBs and page tables, directs transmission of MVPAs and load/store instructions to MV-attached memory and directs transmissions of FAs and cross-fabric load/store instructions via the fabric interface), it is generally the case that much more of the local physical address range will be used (i.e., mapped directly or indirectly to physical memory resources) within a memory-pooling server than in a conventional server (in which only the local memory LPA sub-range would be used). In effect, the local physical addresses outside the range mapped to local memory are used by the memory virtualizer to enable local CPU/OS/processes to issue load/stores to remote memory (cross-fabric or MV-attached memory)—that is, the memory virtualizer presents, to the local CPU/OS/processes, memory physically resident on other servers and/or attached directly to the virtualizer as being local memory (i.e., emulating a local memory installation and memory controller for that emulated local memory). Also, while the fabric addresses recorded within the published free queues of fabric-interconnected virtualizers may be generated and assigned according to any practicable scheme, in at least one embodiment each virtualizer is assigned its own fabric address range (e.g., 64-bit address space) with each queue-popped fabric address being combined (e.g., in a tuple) with an additional node-ID address field that controls transaction routing through the load/store interconnect fabric. Accordingly, the available fabric address space may be substantially larger than the LPA range and thus may not be entirely utilized. This is perfectly acceptable in most applications as no 1:1 FA-to-LPA relationship is required—i.e., any locally allocated LPAs (LPAs used by local processes) would not need a corresponding FA. Conversely, while any FAs supplied to remote servers (i.e., via FQA read) may have a 1:1 mapping with LPAs, that mapping would be managed by translation engine 173 within the virtualizer (with page tables 175, 177 stored in virtualizer-attached memory or local private memory). More generally, while the foregoing discussion focuses primarily on mapping of virtualizer-associated LPAs to remote physical memory via translation to FAs or MVPAs, a subset of the virtualizer-associated LPA range may resolve directly (i.e., without further address translation) to virtualizer-attached memory as mentioned above. Moreover, some portion of virtualizer-attached memory may be reserved by the virtualizer for various operational data such as the various free queues shown at 163 and pointers thereto, FA-indexed and LPA-indexed page tables as shown at 177 and 175, state data, access statistics (as discussed below), and so forth.

In addition to the page allocation and memory access functions discussed above, the allocation/access engine of FIG. 2 autonomously or semi-autonomously collects statistical information regarding remote memory accesses and applies that information, together with limited memory-access information within the local memory VA-to-LPA page tables, to autonomously or semi-autonomously move memory pages between local and remote memory locations and/or move pages between more-latent and less-latent remote memory installations (e.g., between virtualizer-attached and cross-fabric memory, or between a lower-latency cross-fabric memory and a higher-latency cross-fabric memory). This page relocation or page migration function is illustrated conceptually at 179, showing component page-allocation and page-access engines (180, 182) implemented by MV controller 173 together with a page migration engine 184. In addition to implementing the page allocation functions discussed above (e.g., populating VA-to-LPA translation structures for local memory allocations, populating LPA-indexed translation structures for remote memory allocations, including obtaining FAs from remote virtualizers), page allocation engine 180 allocates and initializes access-statistics data structures 185, for example, by allocating one or more fields within page tables and TLBs for counter storage, allocating a counting element within a hardware counter, etc. Similarly, as page access engine 182 carries out remote-memory load/store operations (e.g., generally as discussed above, translating LPA to FA or MVPA and directing the translation result to the fabric interface or virtualizer-attached memory as the case may be), the page access engine updates the access statistics, for example, incrementing an access count for each access to a corresponding memory page (or group of memory pages) within a given interval, with optional inclusion of historical data from prior intervals. At preset/programmed intervals (or in response to predefined or policy-programmed events) page migration engine 184 analyzes the remote-memory access statistics to differentiate between frequently accessed (warmer) and less frequently accessed (cooler) memory pages—generally with a degree of resolution far beyond the single accessed/not-accessed bit stored in conventional page tables—and thus effect usage mapping that enables memory pages to be relocated (migrated) in a strategic distribution between lowest-latency local memory and various remote-memory latency tiers. In a number of embodiments, page migration is executed autonomously by allocation/access engine 133 (without being triggered or controlled by the host-server operating system) and in the background—based on evaluation of both high-resolution remote-memory access statistics and low-resolution access information available regarding local memory pages (accessed or not accessed following a given statistics collection interval)—to yield host-process-transparent performance optimization/improvement. In other OS-cooperative embodiments, allocation/access engine identifies memory pages to be relocated (migration targets) and their general relocation destinations, then passes the migration-target/destination information to the operating system of the host-server together, requesting the OS to complete (and optionally confirm) the page migration. In yet other embodiments, the page migration engine implements page migration (autonomously or OS-cooperatively) in iterative cycles, moving selected pages from low-latency local memory to remote memory for an evaluation period (enabling high-resolution access-statistic collection via page-access engine 182), then distributes the down-migrated pages to various heterogenous-latency destinations, including returning the warmest pages to local memory while maintaining the colder pages within virtualizer-attached memory and possibly moving yet colder pages to lower-latency cross-fabric destinations (i.e., further down-migration).

Figure 3:
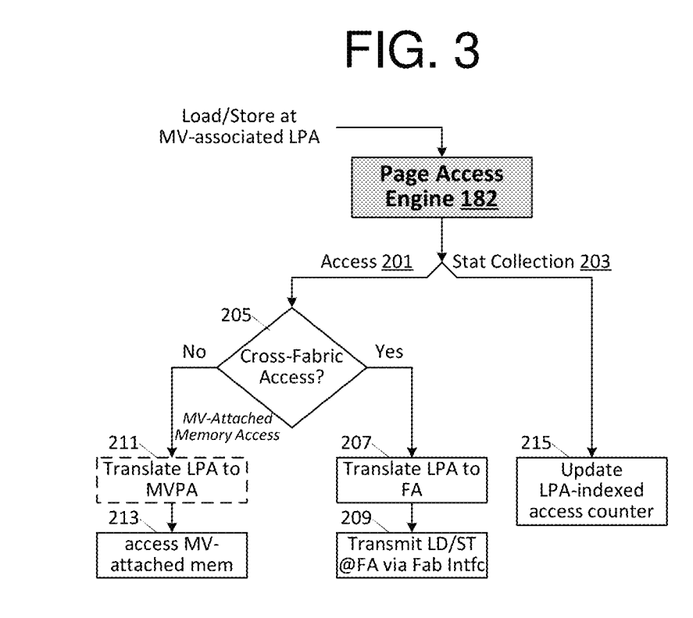
FIG. 3 illustrates exemplary memory-access and statistic collection operations implemented concurrently within the page access engine of FIG. 2.

FIG. 3 illustrates exemplary memory-access and statistic collection operations implemented concurrently (i.e., at least partly overlapping in time) by page access engine 182 of FIG. 2. As shown, page access engine 182 responds to an incoming load/store instruction and MV-associated LPA by concurrently executing memory access and access-statistic collection operations (201 and 203 respectively). In a cross-fabric memory access (affirmative determination at 205), the LPA is translated to a fabric address (207) and then transmitted across the interconnect fabric with the load/store instruction (209). In an access directed to the virtualizer-attached memory (negative determination at 205), the LPA is optionally translated to an memory-virtualizer physical address (MVPA) at 211 and then either the MVPA or the LPA itself is applied to access the virtualizer attached memory at 213. In both cross-fabric and virtualizer-attached memory accesses, the LPA is used to index an access counter and increment or otherwise update the indexed counter as shown at 215.

Figure 4:
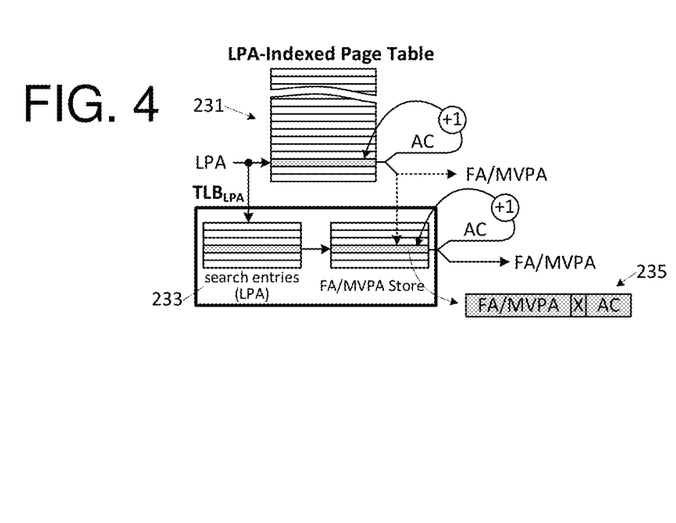
FIG. 4 illustrates a more detailed embodiment of a page table indexed by a local physical address (LPA) and corresponding LPA-indexed translation lookaside buffer having address, cross-fabric and access-count fields organized in a per-entry address/counter tuple.

FIG. 4 illustrates a more detailed embodiment of an LPA-indexed page table 231 and corresponding LPA-indexed translation lookaside buffer 233 having address, cross-fabric and access-count fields (FA/MVPA, X, AC, respectively) organized in a per-entry address/counter tuple 235. The cross-fabric field indicates whether the content of the address field is a fabric address (to be transmitted across the memory-semantic interconnect fabric) or MVPA (to be applied to virtualizer-attached memory), and the access counter is an address count value to be updated in response to a memory access. In one embodiment, for example, an LPA hit within the TLB yields (as part of the TLB output) the corresponding address/counter tuple, with the counter value auto-incremented (to reflect the requested memory access) and written back to the tuple store. The address field of the address/counter tuple is forwarded to either the fabric interconnect or the memory controller for the virtualizer-attached memory (i.e., according to the address type indicated by the cross-fabric indicator). A TLB miss triggers an LPA walk through page table 231 to obtain the corresponding address/counter tuple. In one embodiment the tuple is transferred to the TLB for LPA retry with the auto-incremented access counter being written through the TLB to the corresponding page table entry (i.e., both page table and TLB updated). Alternatively, the access counter within page table 231 may be incremented in place (read, modify, write to increment the access count field within page table 231) while the looked up address (FA or MVPA) is forwarded to downstream circuitry (fabric interface or memory controller for virtualizer-attached memory) concurrently with LPA/tuple-load into TLB 233.

Figure 5:
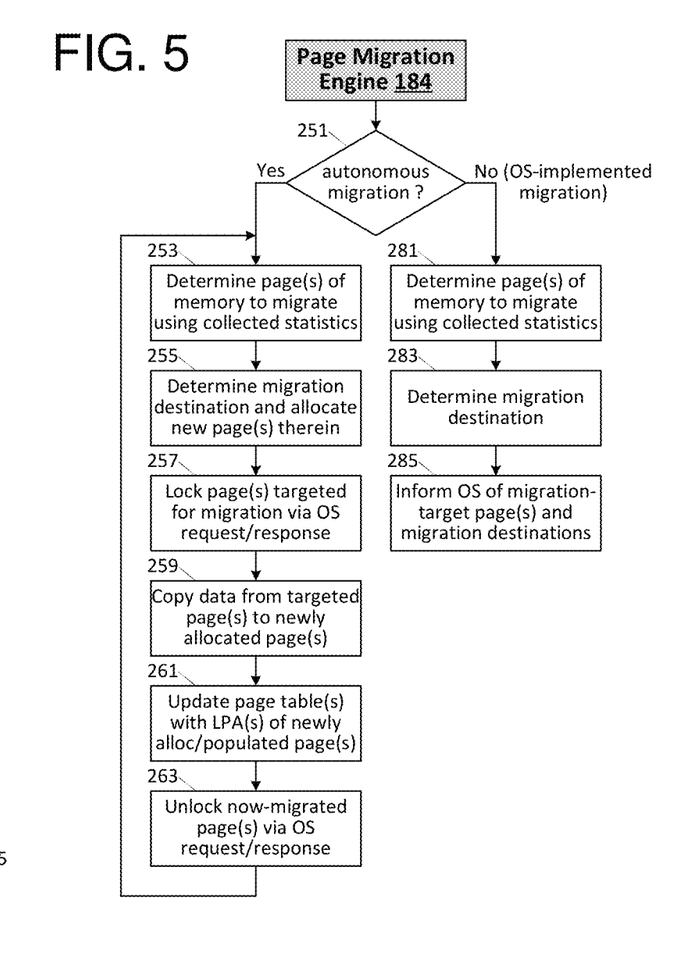
FIG. 5 illustrates a conceptual page migration sequence implemented by the page migration engine of FIG. 2.

FIG. 5 illustrates a conceptual page migration sequence implemented by page migration engine 184 of FIG. 2. In an autonomous migration configuration (affirmative determination at 251—set in accordance with predetermined or runtime programmed page migration policy), the migration engine analyzes collected page-access statistics to identify pages to be migrated (253). As discussed below, the page-access statistics may include both high-resolution access counts generated by the page access engine within the memory virtualizer (i.e., for access to remote memory, both cross-fabric and virtualizer attached) and low-resolution access/no-access information from the VA-to-LPA page table entries for local memory pages (i.e., bit indicating page accessed or not accessed). After identifying memory pages to be migrated ("target pages" or "migration targets") at 253, the migration engine identifies a migration destination and allocates a new memory page (e.g., via coordination with the page allocation engine 180 shown in FIG. 2) in that destination (255)—for example, in virtualizer-attached memory in the case of down-migration from local memory or in cross-fabric memory in the case of down-migration from local memory or virtualizer attached memory, or in the case of up-migration (from higher latency memory to lower latency memory), page allocation within virtualizer-attached memory or local memory. At 257, the migration engine coordinates with the host operating system to lock the migration-target pages (and thus avoid coherency loss due to page access by a host process while page migration is in progress) and coordinates with the OS to issue a TLB shootdown for all the page(s) being migrated (effectively removing the VA to LPA address mapping from the TLB(s) of all local CPUs for the page(s) being migrated). In a number of embodiments, the TLB shootdown operation at 257 may be initiated directly to local CPUs by the memory virtualizer without OS interaction or, depending on the location of the pages of memory to migrate, avoided completely through tracking of page table accesses and page access statistics. While the page is locked, the migration engine copies data from the target page to the newly allocated memory page (259) and then updates relevant address-translation tables (VA to LPA, LPA-to-FA/MVPA) with the LPAs and/or FAs/MVPAs of the newly allocated and populated pages at 261. The migration engine also updates the table entries to free any LPAs and/or FAs/MVPAs for physical page locations no longer in use. Page migration being complete at this point, the migration engine coordinates with the host OS to unlock the migrated pages at 263 (i.e., invoking OS unlock function and awaiting OS response confirming unlock is complete—counterpart to lock request and response).

In a number of embodiments, the OS-synchronized page lock/unlock operations at 257 and 263 are implemented selectively according to the source location of migration-target pages. More specifically, for pages being moved from remote memory to local memory or from one remote memory installation to another (e.g., from virtualizer-attached memory to cross-fabric memory), the memory virtualizer may effectively lock or otherwise ensure coherency with respect to those pages without invoking the OS page-locking function (i.e., omitting the operations at 257 and 263 in favor of virtualizer-implemented coherency assurance). In some implementations, for example, the memory virtualizer maintains an LPA-indexed list of pages undergoing migration (e.g., as a bit field within an address translation table, access statistics table, and/or dedicated "active-migration" lookup table) and affirmatively delays access requests directed LPAs for which migration is indicated (by table lookup) to be under way—completing the requested migration before overwriting/modifying page content. Alternatively, the memory virtualizer may maintain a temporary cached copy of page(s) being migrated and redirect requested accesses to those pages to their cached-counterparts (cache location indicated within table that identifies actively migrating pages), writing data from the temporary cache to the destination page before completing the page migration.

In the OS-coordinated (non-autonomous) migration (negative determination at 251), the migration engine analyzes collected page-access statistics to identify migration-target pages and migration destinations at 281 (as in autonomous mode) but then, instead of performing new page allocation and page-locked data-copy/page-table operations autonomously, the migration engine informs the host OS of the migration-target pages and their respective migration destinations at 285, effectively handing off the migration task for OS execution and awaiting confirmation of completed migration operations.

Figure 6:
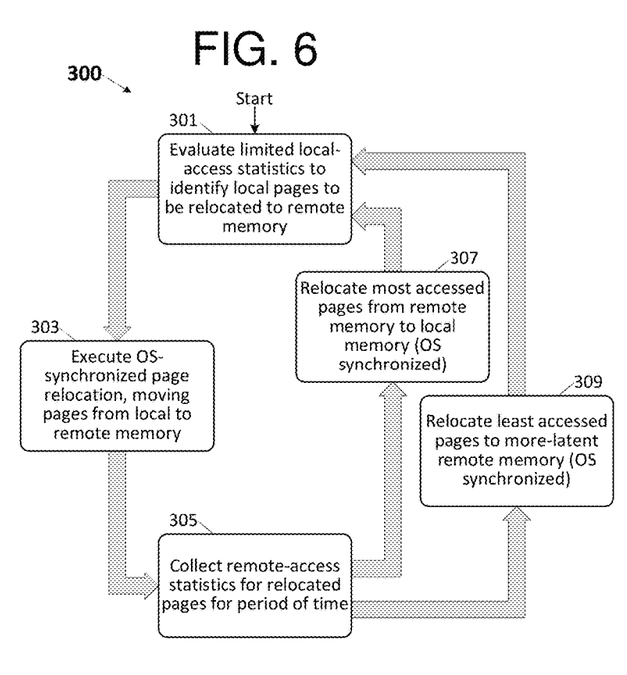
FIG. 6 illustrates an exemplary page migration cycle implemented by the FIG. 2 page-migration engine to iteratively move groups of local memory pages into virtualizer-attached memory (or other remote memory) specifically for the purpose of high-resolution access-statistic collection.

FIG. 6 illustrates an exemplary page migration cycle 300 implemented by the FIG. 2 migration engine to iteratively move groups of local memory pages into virtualizer-attached memory (or other remote memory) specifically for the purpose of high-resolution access-statistic collection—in effect, cycling local memory pages group by group into virtualizer-attached (or other remote) memory to enable collection of high-resolution page-access statistics and thus develop a gradient map of warmer and colder pages. At 301, the migration engine evaluates limited local-memory access statistics (e.g., aforementioned accessed/not-accessed bit) to identify a group of local memory pages to be re-located to remote memory. At 303, the migration engine executes an OS-synchronized page-relocation (e.g., generally as shown at 253-263 in FIG. 5) to down-migrate the identified local memory pages to remote memory (e.g., to virtualizer-attached memory or, in some cases, cross-fabric memory). After down-migrating pages from local to remote memory, high-resolution access statistics are counted for a predetermined or event-delineated collection interval (305). After the collection interval transpires, the collected statistics are evaluated to identify the most accessed pages and up-migrate those relatively warm pages from remote to local memory (307) and, optionally, to identify the least accessed pages and further down-migrate those relatively cold pages to more-latent remote memory (309).

Figure 7:
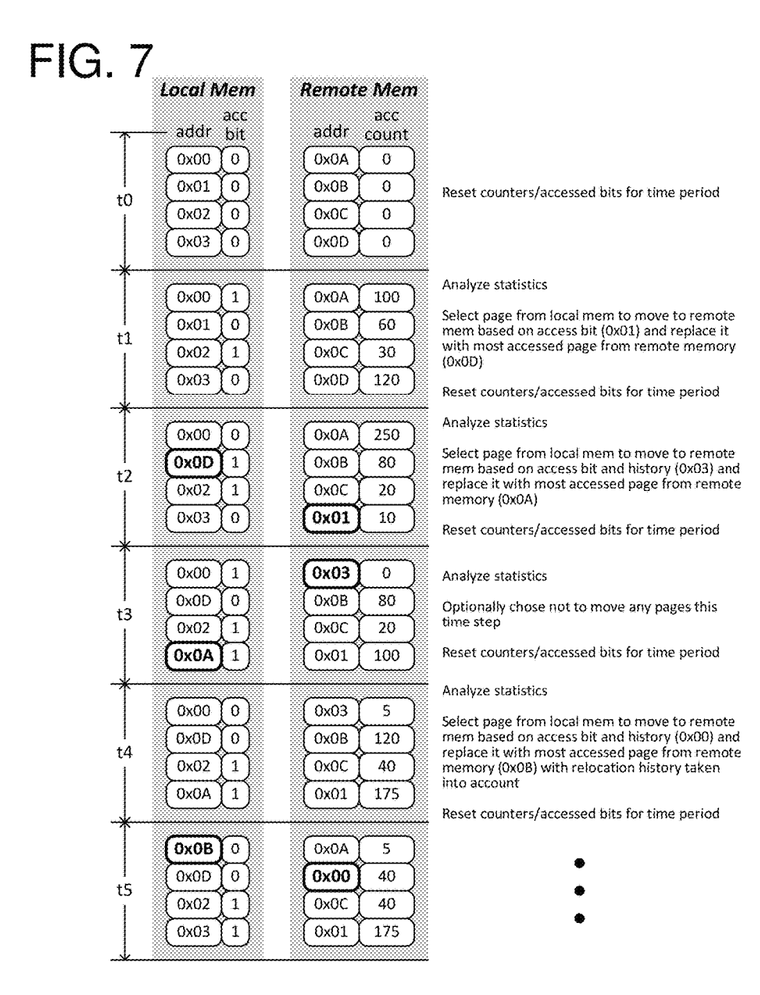
FIG. 7 illustrates an exemplary migration sequence according to the iterative/cyclical example of FIG. 6.

FIG. 7 illustrates an exemplary migration sequence according to the iterative/cyclical example of FIG. 6. At the start of time interval t0, low-resolution access/no-access bits ("access bits") for an exemplary set of local memory pages (having virtual addresses 0x00-0x03) and high-resolution access counters for an exemplary set of remote memory pages (having virtual addresses 0x0A-0x0D) are reset, followed by access-driven bit flip, counter increment for the remainder of t0. At conclusion of t0 and/or start of subsequent interval t1, the access bits and access counters for local and remote memory pages, respectively, are analyzed/evaluated, leading to selection of a relatively cold local memory page for down-migration (local page 0x01 for which access bit shows no-access during t0) and selection of a relatively warm remote memory page (remote page 0x0D having maximum access count within the exemplary four-page group) for up-migration—in this case depicted conceptually as a page-location swap that takes place during t1 such that, at the start of interval t2, pages 0x01 and 0x0D formerly in local memory and remote memory, respectively, have been relocated to opposite destinations in remote memory (0x01) and local memory (0x0D). The virtual addresses of the relocated pages are unchanged by the up and down page migrations (in contrast to the newly assigned LPAs), rendering those migrations transparent to hosted processes. Also, each migrated page is depicted as taking the place of the other merely for ease of understanding and illustration—each page may be relocated to any available physical page location within the destined memory. Further, while the relative number of pages in remote and local memory remains balanced/unchanged within the five collection intervals shown (t0-t5), more pages may be up-migrated than down-migrated (or vice versa) in any time interval, including no migration in either or both directions for a given time interval. Also, while accessed/not-accessed bits for respective local memory pages are shown as being reset after or as part of readout at the conclusion of each collection interval, the accessed/not-accessed bits may alternatively be iteratively polled (read out) and reset during a given collection interval to produce a cumulative count value (e.g., maintained within the memory virtualizer) for accesses directed to respective local memory pages within that collection interval.

Continuing with FIG. 7, after evaluation at the start of a given collection time interval, access counters and access bits are optionally reset so that the counts and bit states shown at the start of the ensuing collection interval reflect statistics collection during the prior interval. Accordingly, at commencement of interval t2, access statistics (bits and counters) reflect collection during time interval t1 and are evaluated to select relatively cold (un-accessed) local memory page 0x03 for down-migration and relatively warm (access count=250) remote memory page 0x0A for up-migration—operations reflected by the relative page locations shown at the start of interval t3. Access-statistic evaluation at the start of t3 leads, in the depicted example, to determination not to migrate any pages during that interval—a determination made based on various factors including, for example and without limitation the relative page warmth, access-count thresholding (comparing remote-page access counts against a programmed and/or heuristically adjusted access-count threshold), page migration history (e.g., factoring recent migration of page 0x0D against its non-access during time interval t2) and so forth. At commencement of interval t4, access statistics are evaluated to select relatively cold (un-accessed) local memory page 0x00 for down-migration and relatively warm (access count=120) remote memory page 0x0B for up-migration—operations reflected by the relative page locations shown at the start of interval t5. Page relocation history is taken into account with respect to local memory page 0x0D (recently up-migrated) and remote memory page 0x01 (recently down-migrated) in determining not to relocate those pages (i.e., remote page 0x0B up-migrated instead of page 0x01 despite the higher access count for the latter).

Figure 8:
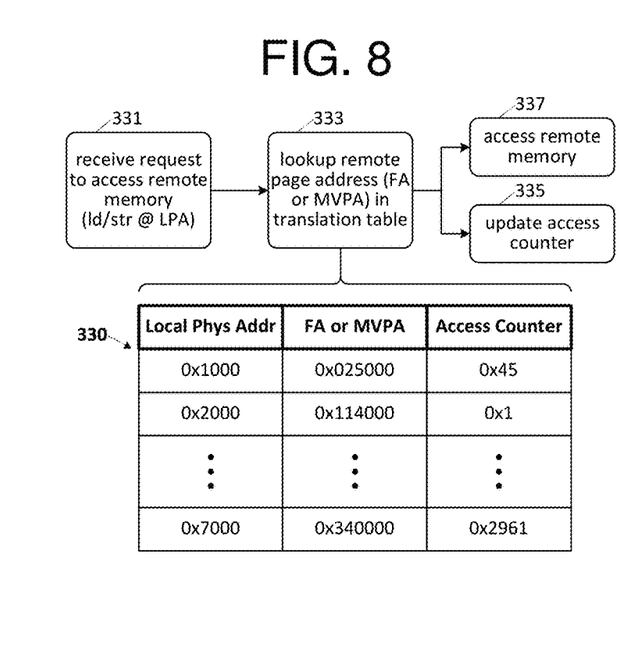
FIG. 8 illustrates exemplary organization and application of a LPA-indexed translation table implemented by the memory virtualizer of FIG. 1.

FIG. 8 illustrates exemplary organization and application of a LPA-indexed translation table 330 implemented by the memory virtualizer of FIG. 1. The table itself includes a set of address/counter tuples (i.e., each table entry includes FA/MVPA address field together with an access counter field and optionally an address qualifier field to indicate the type of address, FA or MVPA, stored within the address field) that are indexed/addressed by an incoming LPA (i.e., LPA field depicted within table, but need not be stored—in contrast to TLB where LPA is stored within CAM to enable parallel comparison of stored LPAs with incoming LPA and thus rapid lookup up of implicated address/counter tuple). When a request to access remote memory is received (3331—load/store at specified LPA), page table 330 is addressed by the LPA (e.g., in parallel with TLB search) to retrieve the corresponding fabric address or MVPA of the remote memory page as shown at 333, and also to readout, update and write-back the access counter for the subject LPA as shown at 335. Access to the remote memory page (specified by the FA/MVPA) is carried out at 337, concurrently with the access counter update. While an access counter per LPA is shown in the FIG. 8 example, the least significant n bits of the LPA could be masked in the access counter selection (i.e., applying the masked LPA against another access counter data structure and/or hardware circuitry) so that every 2n LPAs resolve to the same access counter—in effect a way to dynamically adjust (by programming the value 'n') the granularity of the access-statistics collection and optionally the size of data units selected for migration (i.e., up-migrating/down-migrating 2$^{\textit{i}}$ pages as a unit, updating multiple page table entries per unit migration).

Figure 9:
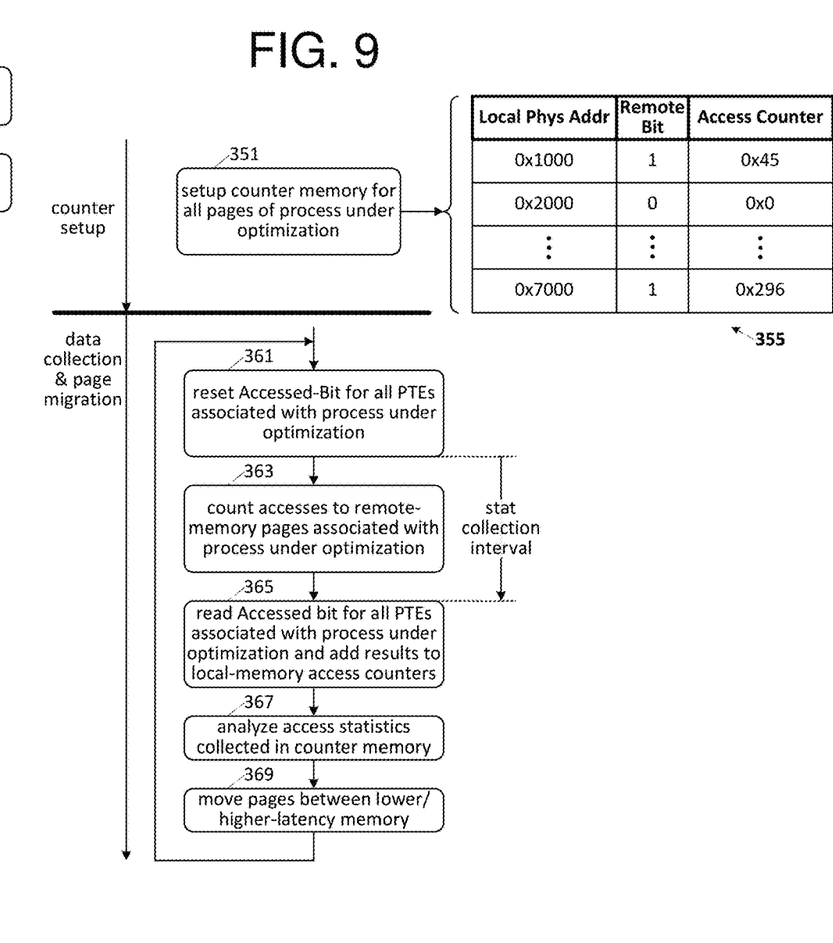
FIG. 9 illustrates an exemplary counter setup and access-statistics collection sequence that may be implemented by various disclosed memory virtualizer embodiments.

FIG. 9 illustrates an exemplary counter setup and access-statistics collection sequence that may be implemented by the memory virtualizer embodiments discussed above. At 351, a counter memory 355 is allocated and initialized (setup) for all pages selected for evaluation and collective latency optimization (i.e., selective migration)—in this case all pages of a host process under optimization. The counter memory includes an access counter and remote-indicator bit ("Remote Bit"), the latter indicating whether the corresponding LPA (shown in the table, but not necessarily present, depending on whether table is indexed by LPA or CAM-searched by LPA) resolves to a local or remote memory page. Thus, exemplary LPAs 0x1000 and 0x7000 resolve to remote memory (remote-indicator bit=1), while LPA 0x2000 resolves to local memory. During an ensuing (after counter setup) data collection and page-migration interval, all accessed-bits for page table entries (PTEs) associated with the process under optimization are reset at 361 (i.e., the accessed/not-accessed bit is cleared for each LPA within the VA-to-LPA page table for which the remote-indicator bit in table 355 is '0'). During an ensuing statistics collection interval, access to remote memory pages associated with the process under optimization are counted (363). Following that collection interval, the accessed/not-accessed bit within all PTEs for the non-remote LPAs are read out at 365 and added to the results for local-memory access counters (i.e., to the entry for non-remote LPA 0x2000 in table 355), with the accessed/not-accessed bits optionally being cleared for repeated statistics collection. At 367, the statistics collected at 363 and supplemented by accessed-bit readout at 365 are analyzed to identify migration targets, followed by up-migration and/or down-migration (moving pages from remote memory to local memory and/or from local memory to remote memory; moving pages from more-latent remote memory to less-latent remote memory and/or from less-latent remote memory to more-latent remote memory) is executed at 369—potentially in parallel with further statistics collection for the process under optimization or for a newly selected process.

Figure 10:
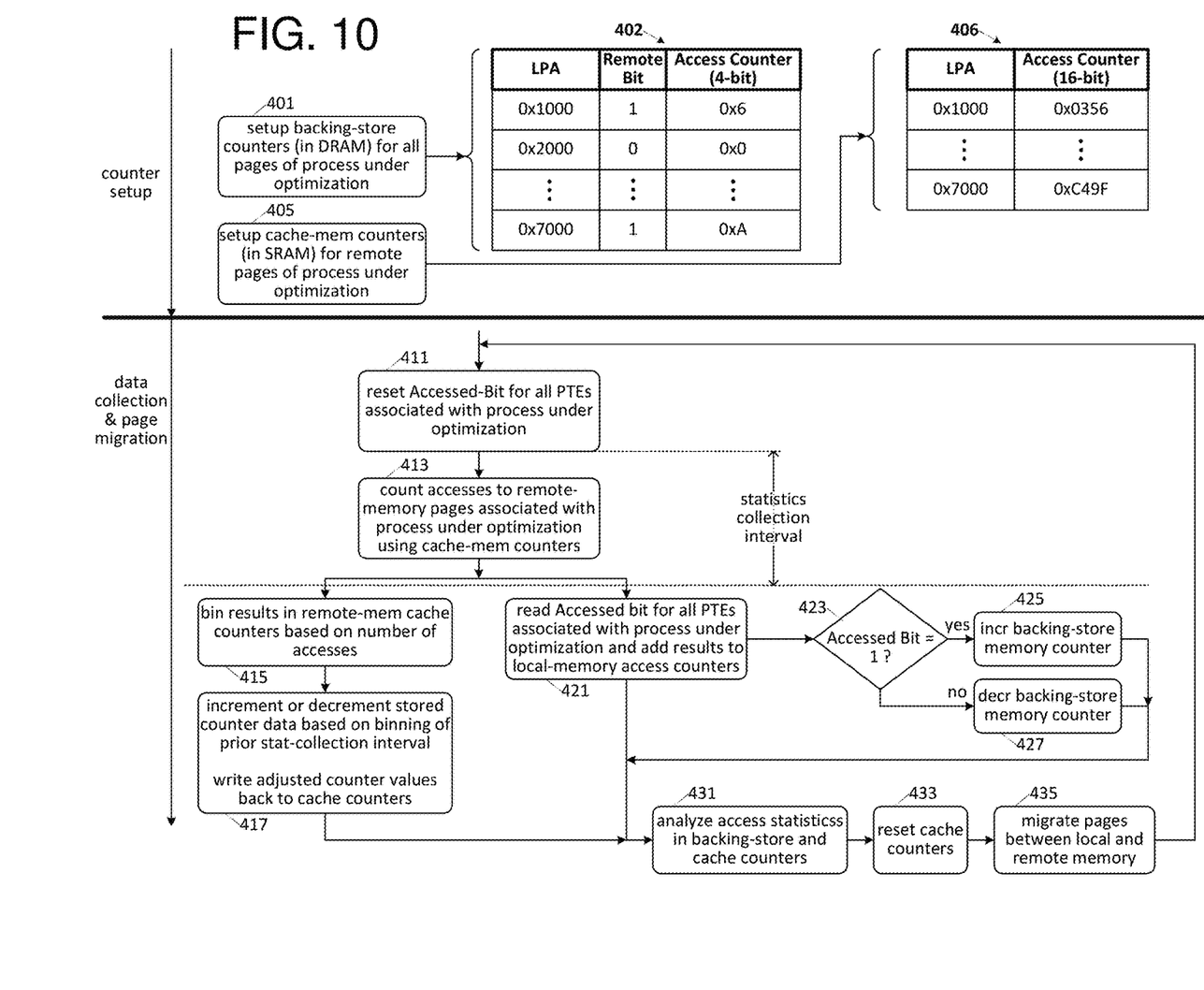
FIG. 10 illustrates another exemplary counter setup and access-statistics collection sequence that may be implemented by various memory virtualizer embodiments disclosed herein.

FIG. 10 illustrates another exemplary counter setup and access-statistics collection sequence that may be implemented by various memory virtualizer embodiments presented herein. In this case, counter setup operations at 401 and 403 are split between infrequently updated backing-store counters 401 for local memory pages (updated once per collection interval by interrogating accessed/not-accessed bit in PTE) and relatively frequently updated access counters 403 for remote memory. In the depicted example, for instance, the backing-store counters for local memory pages are maintained in DRAM and limited to relatively small count fields (e.g., 4-bit count storage), while larger remote-memory access count values (e.g., 16-bit) are maintained in high-speed SRAM memory. At the start of each data collection and page-migration cycle, the accessed/not-accessed bit is reset within all LPA-indexed PTEs for a process under optimization (411), followed by a collection interval in which remote-page accesses are counted within the SRAM (cache memory) counters (413). Following statistics collection, access-count values are read out of remote-page access counters 406 and binned at 415 according to number of accesses (e.g., organized within respective warmest, less-warm, cooler, coldest data structures according to comparisons within one or more thresholds) and then, at 417, adjusted up or down based on historical binning data (i.e., binning from a prior statistics-collection interval and thus in a previous loop iteration) before being written back to the cache-counter store 406.

Concurrently with history-data-adjustment of the remote page access counts (i.e., operations at 415 and 417), the accessed/not-accessed bit within all local-page PTEs are read out (421) and used to increment or decrement the backing-store counters 402 according to bit state (423, 425, 427). At 431, the access counts within the backing-store and cache counters (low-resolution and high-resolution access counts) are analyzed to identify up-migration and/or down-migration targets, followed by cache-counter reset 433 and autonomous or OS-assisted migration of those target pages (435) before proceeding with another reset/collection/migration loop.

Figure 11:
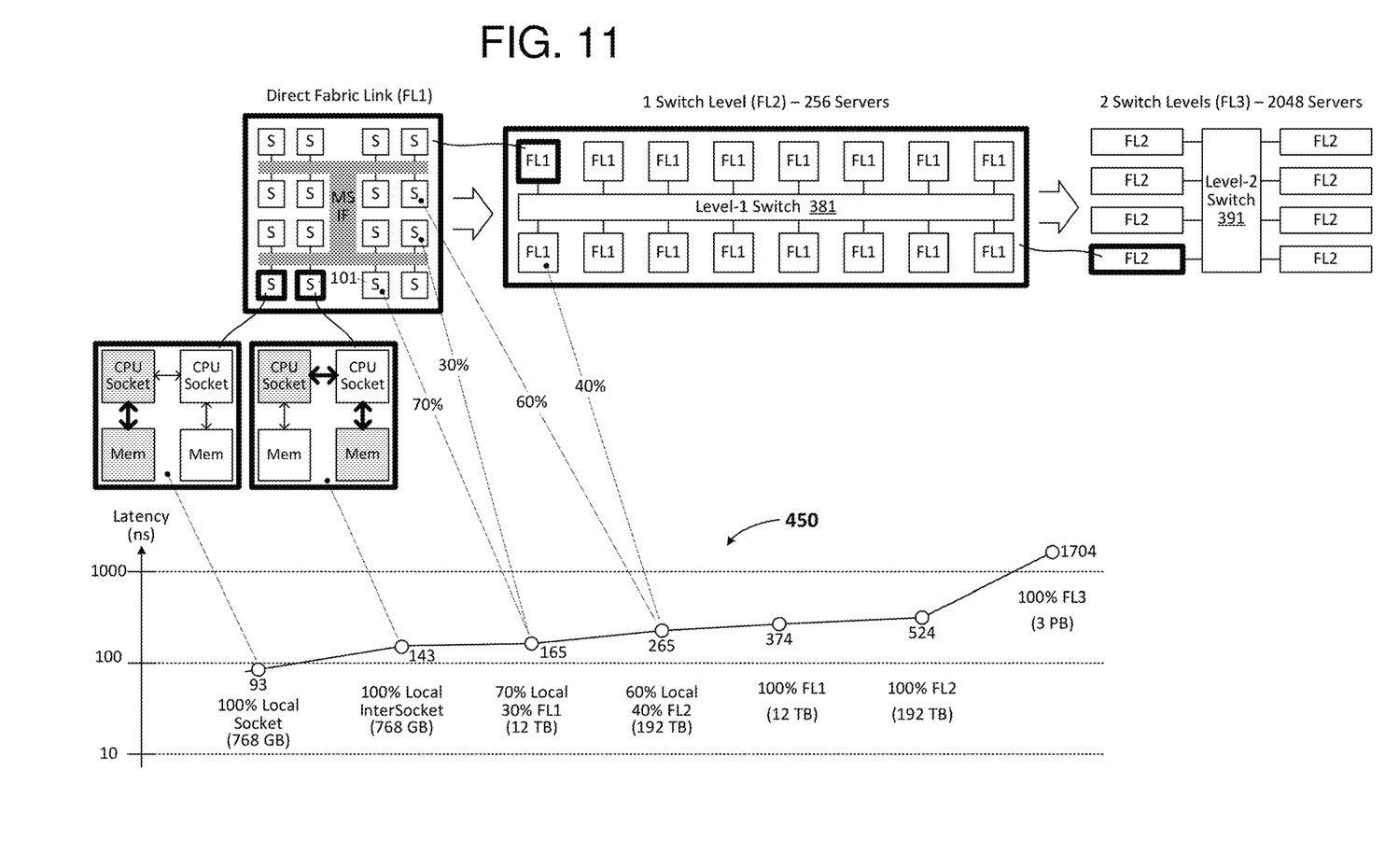
FIG. 11 illustrates an exemplary hierarchical organization within memory-pooling servers 101 within the heterogenous-latency data center of FIG. 1.

FIG. 11 illustrates an exemplary hierarchical organization within memory-pooling servers 101 within the heterogenous-latency data center of FIG. 1—that is, local memory installations with different levels of latency (according to whether access is transacted directly or through a neighboring CPU socket) and remote memory installations having progressively higher latencies from the perspective of processes hosted by a given CPU. At a first level of the hierarchy, referred to herein as fabric-level 1 (FL1), individual groups of N memory-pooling servers 101 (each having two CPU sockets and two corresponding local memory installations in the example) are directly coupled to one another via a memory-semantic interconnect fabric (N=16 in the FL1 example shown). At a second level of the hierarchy a switch structure 381 (Level-1 Switch) interconnects a number (M) of FL1 groups into a fabric-level 2 group, FL2 (i.e., M×N memory-pooling servers, where M=N=16 and thus 256 servers per FL2), and at the third hierarchical level, another switch structure 391 (Level-2 Switch) interconnects a number (K) of FL2 groups into an FL3 data-center-wide group. K=8 in the depicted example, so that the data center contains 2048 memory-pooling servers including 128 FL1 groups and 8 FL2 groups. The hierarchical arrangement enables all servers in the data center (all within FL3) to contribute to and receive exclusive allocations out of a collective memory pool, with memory accesses directed to the collective memory pool exhibiting ascending latency according to traversed hierarchical levels. For example, load/store transactions directed to non-local public memory within an FL1 group incurs the nominal latency of the memory-semantic fabric, whereas transactions between servers in different FL1 groups, but the same FL2 group incur the fabric overhead plus overhead of one switch level, and transactions between servers in different FL2 groups incur the fabric overhead plus overhead of two switch-levels. Accordingly, in a number of embodiments, the memory virtualizer component of a given server executes (autonomously or with OS assistance) page migrations between various local and remote memory installations, including up-migrating and down-migrating pages between higher-latency and lower-latency remote memory installations and, similarly, up/down-migrating pages between higher-latency and lower-latency local memory installations (in addition to migration between local and remote memory).

Graph 450 illustrates examples of average memory-access latencies and collective memory pool size within the FL1/FL2/FL3 server hierarchy, assuming, for example, that the local memory coupled to each CPU socket is a 768 GB DRAM installation and that half of each installation is contributed to the public memory pool (i.e., half of each DRAM installation reserved as private memory). The percentages shown with respect to each latency metric refer to the relative numbers of accesses directed to respective physical memory locations. In a number of embodiments, latencies and other characteristics and features of remotely available memory may be exposed to the operating systems and processes executing within a given memory-pooling server, enabling allocation requests to be differentiated and parameterized. With regard to performance-optimizing page migration, for example, average latencies and available storage at a given tier in the latency hierarchy may be evaluated in real time by the page migration engine within the memory virtualizer of a given MP server and factored into page migration decisions together with the various access statistics discussed above.

The various component circuit blocks disclosed herein (e.g., memory virtualizer and page migration engine, page access engine and page allocation engine components thereof) may be implemented by dedicated hardware and/or programmed processor(s) or any combination dedicated hardware and programmed processor(s). The component circuit blocks may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, the memory volumes, memory types, specific address field sizes, address translation schemes and the like may be different from those shown in alternative embodiments. Memory-pooling servers may be deployed in various organizations other than those shown. Additionally, interconnections between memory-pooling servers or internal components or blocks thereof may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit or component is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation within a computing system, the method comprising:

relocating memory pages from an operating memory to an access-counting memory, including updating one or more page tables such that virtual addresses corresponding to the memory pages are re-mapped from first physical addresses that resolve to the operating memory to second physical addresses that resolve to the access-counting memory;

after relocating the memory pages, counting accesses to the memory pages within the access-counting memory over a first time interval to accrue access statistics indicative of respective numbers of accesses directed to individual ones of the memory pages; and selectively relocating one or more of the memory pages from the access-counting memory to the operating memory based on the access statistics;

wherein relocating the memory pages from the operating memory to the access-counting memory comprises selecting, as the memory pages in a first memory migration cycle, a first set of memory pages within the operating memory, the method further comprising, after the first time interval transpires, selecting a second set of memory pages within the operating memory, relocating the second set of memory pages from the operating memory to the access-counting memory and, after relocating the second set of memory pages to the access-counting memory, counting accesses to the second set of memory pages over a second time interval to accrue additional access statistics.

2. The method of claim 1 wherein the access-counting memory is characterized by a higher access latency than the operating memory such that relocating the memory pages from the operating memory to the access-counting memory comprises increasing access latency with respect to the memory pages.

3. The method of claim 1 wherein the computing system comprises a server computer in which both the operating memory and the access-counting memory reside, and wherein the access-counting memory is accessed via a cache-coherent interface between a processor of the server computer and a control component coupled to the access-counting memory.

4. The method of claim 1 wherein the computing system comprises first and second server computers and wherein the operating memory is disposed within the first server computer and at least a portion of the access-counting memory is disposed within the second server computer and accessed by the first server computer via a memory-semantic interconnect fabric coupled between the first and second server computers.

5. The method of claim 1 wherein the access-counting memory comprises a dynamic random access memory (DRAM) installation and a counter memory, and wherein counting accesses to the memory pages within the access-counting memory over the first time interval comprises, for each access to one of the memory pages within the access-counting memory, addressing the counter memory with a corresponding one of the second physical addresses to read out a count value corresponding to the one of the memory pages, adjusting the count value and writing the adjusted count value back to the counter memory.

6. The method of claim 5 wherein the counter memory is implemented as part of an address translation structure, and wherein addressing the counter memory with the corresponding one of the second physical addresses comprises reading out an entry of the address translation structure using the corresponding one of the second physical addresses, the entry of the address translation structure including the count value together with a third physical address that is applied to access the one of the memory pages within the DRAM installation.

7. The method of claim 1 further comprising, prior to selectively relocating one or more of the memory pages from the access-counting memory to the operating memory based on the access statistics, adjusting the access statistics based on historical access-count information obtained in a time interval prior to the first time interval.

8. The method of claim 1 further comprising, prior to relocating pages from the operating memory to the access-counting memory, identifying the memory pages within the operating memory based in part on at least one of the following: state of a respective accessed bit/not-accessed bit maintained within a page table entry for each of the pages within operating memory; or a process identifier value associating the memory pages within the operating memory with a process execution within the computing system.

9. The method of claim 1 wherein the access-counting memory and operating memory comprise respective sets of dynamic random access memory components.

10. An integrated circuit component comprising:

a first interface to be coupled to a processing unit and, via the processing unit, to an operating memory;

a second interface to be coupled to an access-counting memory; and control circuitry to:

relocate memory pages from the operating memory to the access-counting memory via the first and second interfaces, including updating one or more page tables maintained, at least in part, within the processing unit such that virtual addresses corresponding to the memory pages are re-mapped from first physical addresses that resolve to the operating memory to second physical addresses that resolve to the access-counting memory;

after relocating the memory pages, count accesses to the memory pages within the access-counting memory over a first time interval to accrue access statistics indicative of respective numbers of accesses directed to individual ones of the memory pages; and selectively relocate one or more of the memory pages from the access-counting memory to the operating memory based on the access statistics;

wherein the control circuitry to relocate the memory pages from the operating memory to the access-counting memory comprises circuitry to:

select, as the memory pages in a first memory migration cycle, a first set of memory pages within the operating memory;

select, after the first time interval transpires, a second set of memory pages within the operating memory;

relocate the second set of memory pages from the operating memory to the access-counting memory; and after relocating the second set of memory pages to the access-counting memory, count accesses to the second set of memory pages over a second time interval to accrue additional access statistics.

11. The integrated circuit component of claim 10 wherein the access-counting memory is characterized by a higher access latency than the operating memory such that relocating the memory pages from the operating memory to the access-counting memory comprises increasing access latency with respect to the memory pages.

12. The integrated circuit component of claim 10 wherein the access-counting memory comprises a dynamic random access memory (DRAM) installation and a counter memory, and wherein the control circuitry to count accesses to the memory pages within the access-counting memory over the first time interval comprises circuitry that, for each access to one of the memory pages within the access-counting memory:

addresses the counter memory with a corresponding one of the second physical addresses to read out a count value corresponding to the one of the memory pages, adjusts the count value, and writes the adjusted count value back to the counter memory.

13. The integrated circuit component of claim 12 wherein the counter memory is implemented within an address translation structure stored in the access-counting memory, and wherein the circuitry to address the counter memory with the corresponding one of the second physical addresses comprises circuitry to read out an entry of the address translation structure using the corresponding one of the second physical addresses, the entry of the address translation structure including the count value together with a third physical address that is applied by the control circuitry to access the one of the memory pages within the DRAM installation.

14. The integrated circuit component of claim 10 wherein prior to selectively relocating one or more of the memory pages from the access-counting memory to the operating memory based on the access statistics, the control circuitry adjusts the access statistics based on historical access-count information obtained in a time interval prior to the first time interval.

15. The integrated circuit component of claim 10 wherein, prior to relocating pages from the operating memory to the access-counting memory, the control circuitry identifies the memory pages within the operating memory based in part on at least one of the following: state of a respective accessed bit/not-accessed bit maintained within a page table entry for each of the pages within the operating memory; or a process identifier value associating the memory pages within the operating memory with a process execution hosted by the processing unit.

16. A computing system comprising:
a processing unit;
an operating memory;
an access-counting memory; and
control circuitry to:

relocate memory pages from the operating memory to the access-counting memory, including updating one or more page tables maintained, at least in part, within the processing unit such that virtual addresses corresponding to the memory pages are re-mapped from first physical addresses that resolve to the operating memory to second physical addresses that resolve to the access-counting memory;

after relocating the memory pages, count accesses to the memory pages within the access-counting memory over a first time interval to accrue access statistics indicative of respective numbers of accesses directed to individual ones of the memory pages; and selectively relocate one or more of the memory pages from the access-counting memory to the operating memory based on the access statistics;

wherein the control circuitry to relocate the memory pages from the operating memory to the access-counting memory comprises circuitry to:

select, as the memory pages in a first memory migration cycle, a first set of memory pages within the operating memory;

select, after the first time interval transpires, a second set of memory pages within the operating memory;

relocate the second set of memory pages from the operating memory to the access-counting memory; and after relocating the second set of memory pages to the access-counting memory, count accesses to the second set of memory pages over a second time interval to accrue additional access statistics.

17. The computing system of claim 16 wherein the computing system comprises a server computer in which the processing unit, operating memory, access-counting memory and control circuitry reside, the server computer comprising a cache-coherent interface between the processing unit and the control component through which the access-counting memory is accessed.

18. The computing system of claim 16 wherein the computing system comprises first and second server computers coupled to one another via a memory-semantic interconnect fabric and wherein the processing unit, operating memory and control circuitry are disposed within the first server computer and at least a portion of the access-counting memory is disposed within the second server computer and accessed by the first server computer via the control component and the memory-semantic interconnect fabric.

19. The computing system of claim 16 wherein the access-counting memory and operating memory comprise respective sets of dynamic random access memory components.

\* \* \* \* \*